United States Patent [19]

Torossian et al.

[11] 4,103,195

[45] Jul. 25, 1978

[54] BONDED LAMINATIONS FORMING A STATOR CORE

[75] Inventors: Kevork A. Torossian, Schenectady; Alexander L. Lynn, Duanesburg, both of N.Y.

[73] Assignee: General Electric Company, Schenectady, N.Y.

[21] Appl. No.: 781,439

[22] Filed: Mar. 25, 1977

Related U.S. Application Data

[63] Continuation-in-part of Ser. No. 713,440, Oct. 7, 1976.

[51] Int. Cl.$^2$ .......................... H02K 1/12; H02K 1/06
[52] U.S. Cl. ...................................... 310/259; 310/45; 310/217
[58] Field of Search ................. 310/217, 259, 45, 216, 310/254, 256

[56] References Cited

U.S. PATENT DOCUMENTS

| | | | |
|---|---|---|---|
| 2,390,863 | 12/1945 | Amidon et al. | 310/217 UX |
| 2,814,744 | 11/1957 | Demetriou et al. | 310/45 X |
| 3,122,667 | 2/1964 | Baciu | 310/259 X |
| 3,213,302 | 10/1965 | Barney | 310/45 |
| 3,336,415 | 8/1967 | Kennedy et al. | 310/45 UX |

*Primary Examiner*—Mark O. Budd
*Attorney, Agent, or Firm*—Herbert E. Messenger; John F. Ahern; James W. Mitchell

[57] ABSTRACT

Lamination of the stator core is accomplished by stacking the core with a series of segments or punchings of steel each of which is insulated with a layer of adhesive enamel on both sides. The adhesive enamel is comprised of an epoxy resin and a sufficient amount of a glass fiber spacer filler to substantially provide uniform separation and insulation between the individual segments.

9 Claims, 4 Drawing Figures

BONDED LAMINATIONS FORMING A STATOR CORE

This is a continuation-in-part of pending application Ser. No. 713,440 originally deposited Aug. 11, 1976 and granted a filing date of Aug. 11, 1976.

Large turbine driven generators are used in the production of electrical power. The two major parts of a generator are known by electrical designation as the field and the armature. A field consists of a source of magnetic lines of flux, which is made from a wound coil that becomes an electromagnet. Since the part rotates it is called the "rotor". The armature is an assembly of conductors in which voltage is induced. It has been called the "stator", because it is the stationary part of the equipment. A detailed description of such machines is given in a publication by Y. S. Hargett, Large Steam Turbine-Driven Generators, General Electric Co., Schenectady, N.Y., Aug. 1967.

The stator includes the stator core, the stator frame and the stator windings. The function of the stator core is to provide a low reluctance path for the lines of magnetic flux from the field, and at the same time to support the coils of the stator winding. The stator frame supports the stator core within the generator. The armature winding is formed by insulated bars or half coils assembled in stator core slots and joined at the ends to form coils and connected in the proper phase belts by connection rings at the end of the windings.

The stator core is made in the form of a cylinder of high permeability steel which fully encloses the circumference of the field. The stator core is of a laminate construction wherein the construction may be accomplished by stacking the core with a series of overlapping segments or punchings of steel, each of which is insulated with a layer of enamel on both sides. In one arrangement these segments are stacked on key bars at the outside diameter which maintain the alignment of the outer edges. The complete core for a large generator may contain several hundred thousand individual segments or punchings.

The core has been assembled in the past by workmen depositing the laminations by hand. Alternatively, the laminations may be stacked mechanically by an apparatus disclosed by J. G. Quinn, U.S. Pat. No. 2,889,058 entitled, Lamination Stacking Machine. Heretofore, the laminations were then coated with an enamel for electrical insulation from abutting laminations. It is essential that the individual laminations in the stator core remain separated and insulated from each other to prevent circulating current between laminations.

The stator laminations are pressed at intervals during the stacking process to flatten them and achieve compact assembly. When fully stacked, the entire core has heretofore been clamped end-to-end with pressure and held by nuts on the full length of the key bars. The end-to-end clamping pressure produces friction between the individual laminations to make the complete core behave almost like a solid cylinder. Although the stator core is very stiff, deflection takes place due to the magnetic power of the field. This results in vibrations which must be supressed within the machine.

In order to prevent vibration, an additional adhesive is applied to certain areas of the stator core, i.e., about 5% of the core at the end irons, to impart rigidity to the structure. It is not practical or economical to apply two coatings, i.e., an insulating coating and an adhesive coating, to all the laminations since this requires passing each of the up to several hundred thousand per machine laminations through the coating apparatus twice. However, previous attempts to eliminate the dual step process of cured insulating enamel plus adhesive bond in favor of a single coating functioning both as adhesive and insulation have not been completely satisfactory due to surface irregularities of the punchings.

Quite surprisingly, we have discovered that we can substantially laminate the entire core by means of a chemical bond and using a single adhesive-insulating coating applied to the punchings. Advantages provided by our novel system include the formation of an integrally bonded stator core by means of a single adhesive insulating coating, improvement of heat transfer between laminations, and curing and bonding the stator core by a single step. It now becomes feasible to form the stator frame and such prebonded modules be assembled outside of the stator frame and such prebonded modules can be tested prior to being placed in the generator.

In accordance with the invention, we have discovered a method of laminating a stator core by stacking a series of segments or punchings of steel each of which is coated with a single layer of adhesive insulating enamel on both sides. The enamel is comprised of an epoxy resin and a sufficient amount of a glass fiber spacer filler to substantially provide a uniform separation and insulation between the individual segments. The laminated core is integrally bonded by means of an adhesive chemical bond. In one aspect of the invention, we have discovered a method of forming a bonded stator core by the steps of forming steel segments having an inorganic coating thereon, applying an insulating adhesive coating on both sides of the segments, the coating comprising an epoxy resin, a curing agent for the resin which provides latency at room temperature and coupled with a cure at elevated temperatures, a glass fiber spacer filler having a diameter of about 0.45–0.55 mil in an amount sufficient to provide uniform separation and insulation between the segments, inorganic fillers to provide a working viscosity and maintain the glass fiber homogeneously dispersed in the resin, and a suitable solvent for application of the coating. Thereafter the solvent is removed from the coated segments, the dried and tack-free coated segments are stacked in a configuration of an element for forming a substantial portion of or the entire stator core and the element is pressed and cured under conditions of temperature and pressure to form an integral bond between the segments. Another aspect of our invention relates to an integrally bonded stator core for a generator comprising a series of segments of steel each of which is bonded to and insulated from an adjacent segment, and an interlayer between the segments for bonding and insulating the segments, the interlayer being a thermally cured epoxy resin and a glass fiber filler having a uniform diameter of about 0.45–0.55 mil to provide uniform separation and insulation between the segments.

Figure 1:
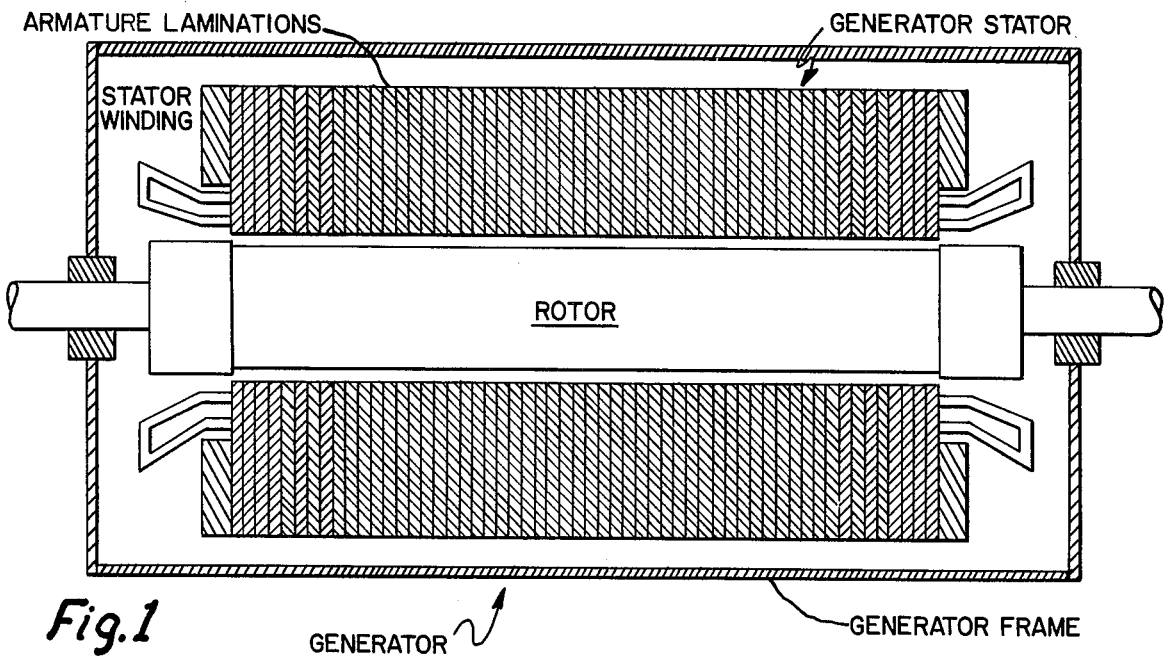
FIG. 1 illustrates schematically a generator of the dynamoelectric type having a frame and armature with windings thereon and a rotor.
Figure 2:
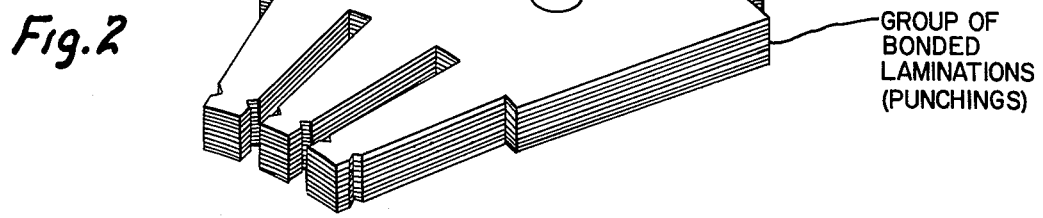
FIG. 2 illustrates a group of bonded laminations in a preassembled array.
Figure 3:
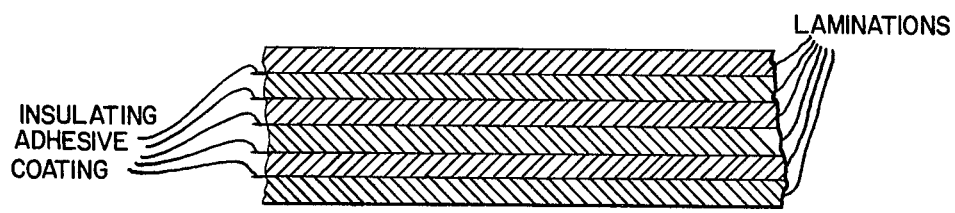
FIG. 3 illustrates a partial vertical elevation view of the group are bonded laminations of FIG. 2; and, FIG. 4 illustrates a greatly magnified fashion the surface area "A" of FIG. 2 and the random orientation of spacer fibers in accordance with the invention.
Figure 4:
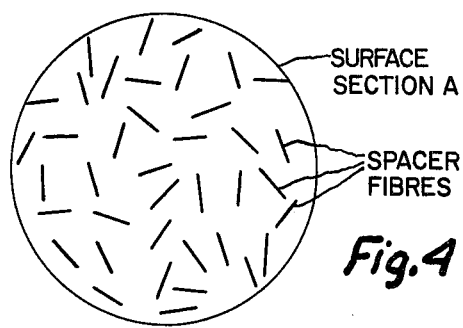

The laminations or segments are approximately 0.010 to 0.030 inch thick and are stamped from a suitable grade of magnetic steel strip stock and then appropriately heat treated and coated with a thin inorganic coating, e.g., 0.10–0.25 mil coating of magnesium phosphate to keep the laminations separated prior to use. This coating has been designated as C-10 by the steel manufacturer. The segments are like a series of flat cards which are pie-shaped so that they may be stacked on key bars at the outside diameter and the inside diameter has slots in which the stator winding is later assembled as shown in FIG. 3 of the J. G. Quinn patent cited hereinabove. While the surfaces of a segment appear normally smooth and regular, under magnification the surfaces are really quite irregular and there appear to be elevations or peaks and depressions or valleys. Attempts to form laminations using a single coating of an ordinary bonding composition between the segments having a critical thickness of about 0.5 mil are not possible because of the increased probability of laminates becoming shorted together due to the surface irregularities.

As we have mentioned above the stator core of a large dynamoelectric generator may contain as many as several hundred thousand segments. The coating on the top and on the bottom of each segment of such an enormous machine has been critically defined as about 0.45–0.55 mil. The generating equipment is designed and built for high reliability and long life. Thus factors such as the interlayer between laminations must be extremely precise. Since the inorganic coating on each side of a segment is about 0.10 mil, the remainder or about 0.35–0.45 mil is the thickness of the insulating adhesive.

The insulating adhesive comprises about the following composition:

| Ingredient | Broad Range (wt.%) | Preferred (wt.%) |
|---|---|---|
| Epoxy resin | 30–35% | 30.4–31% |
| Curing agent | up to 4% | 1.6–2.3% |
| Accelerator | up to 1% | about .8% |
| Glass fiber spacer | 10–25% | 10.3–20% |
| Inorganic filler | 10–25% | 16.1–21.8% |
| Organic solvent | 25–40% | 30.5–35.2% |

Any of the conventional epoxy resins having 1,2-epoxy groups are useful in connection with the present invention. These resins are commercially available and have the general formula:

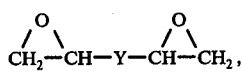

wherein Y is the residue of the reaction product of a polyfunctional halohydrin, such as epichlorohydrin, and a polyhydric phenol. These resins are well known and commercially available. Typical phenols useful in the preparation of the resin are resorcinol and various bisphenols resulting from the condensation of phenol with aldehydes and ketones such as formaldehyde, acetaldehyde, and acetone. Representative of the bisphenols is 2,2'-bis(p-hydroxyphenyl)propane (known as Bisphenol A); 4,4'-dihydroxydiphenylsulfone; 4,4'-dihydroxybiphenyl; 4,4'-dihydroxydiphenylmethane; 2,2'-dihydroxydiphenyloxide, etc.

The epoxy resin useful for most applications in the practice of the present invention corresponds to the general formula:

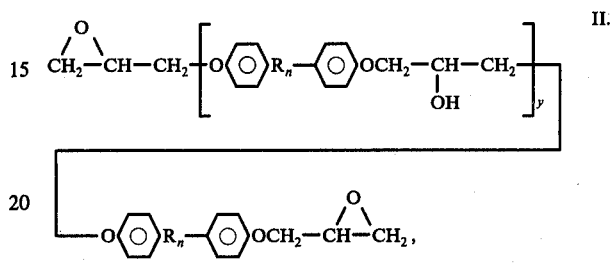

wherein $R$ is a divalent radical selected from the group consisting of saturated alkylene radicals of from 1 to 8 carbon atoms, oxygen, and the sulfone group, $y$ is 0 or an integer having a value up to 25 and $n$ is 0 or 1. Specifically, $R$ may be methylene, ethylene, propylene, isopropylene, isopropylidene, butylene, isobutylene, etc.

The most common epoxy resin of this type is the reaction product of epichlorohydrin and Bisphenol A which corresponds to the structural formula:

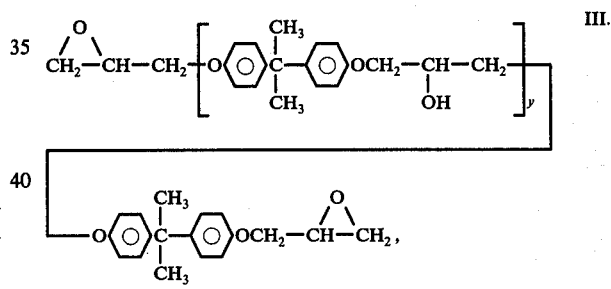

wherein $y$ has the meaning given above.

The instant epoxy resins may also be epoxy novolac resins, which are available commercially as CIBA ECN resins. These are derived from an ortho-cresol-formaldehyde novolac which is then reacted with epichlorohydrin to form a polyepoxide. Representative epoxy novolac resins correspond to the formula:

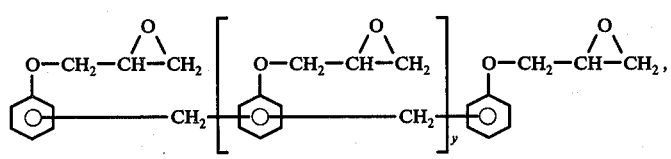

wherein $y$ has the value given above.

An epoxy resin which is formed from tetraphenylol ethane and epichlorohydrin is also suitable. An intermediate from which this resin is prepared is illustrated by the formula:

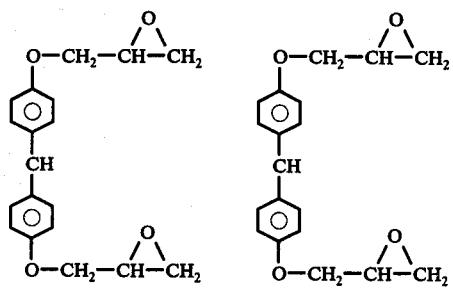

The instant epoxy resin may be liquid or solid. It generally has an epoxy equivalent in the range of 100 to 4000 and preferably from 150 to 500. The epoxy equivalent weight is the weight of resin in grams which contain 1 gram equivalent of epoxy.

Curing agents for conventional type epoxy resins are disclosed by S. Oleesky and G. Mohr, Handbook of Reinforced Plastics, Reinhold, New York, pages 74–75. Most of the curing agents described are undesirable for the present application because they promote too rapid cure at room temperature and have a short pot life. The criteria for a desirable curing agent for laminating the large number of segments are that the agent must require elevated temperature for cure and must impart a long pot life. One useful system is disclosed by M. Markovitz, U.S. Pat. No. 3,776,978 which discloses a mixture of a phenol and an organic titanate. Also probably useful are those designated as latent curing agents, such as boron trifluoride-monoethylamine complex, triethanolamine borate which have long pot lives and are cure activated by heat; and acid anhydrides, such as phthalic anhydride, and mixtures of pyromellitic dianhydride and maleic anhydride which require elevated temperature cures.

A preferred curing agent for the epoxy resins employed herein is dicyandiamide having the structure:

$$H_2NCNHC \equiv N$$
$$\overset{\overset{NH}{\|}}{}$$

Curing can occur through all four nitrogen-containing functional groups. An advantage of dicyandiamide, when used with solid diglycidyl ether of Bisphenol A for laminating applications, is that it provides latency at room temperature coupled with rapid cures at 145°–165° C. For solid resins, it is normally used in a solvent such as acetone-water, dimethyl formamide or a glycol ether. When thoroughly milled or dissolved into the epoxy system, it will provide a one-container system stable for at least 6 months. While the amount of curing agent can vary to some extent, I have found that an effective amount generally is in the range of about 2.5–7.5 parts by weight per 100 parts of epoxy resin. The preferred concentration of the curing agent for a diglycidyl ether of Bisphenol A resin is about 4.7 parts by weight.

Optionally, the adhesive coating composition employing the preferred dicyandiamide curing agent incorporates an imidazole accelerator, especially a substituted imidazole. These compounds may be represented by the general formula:

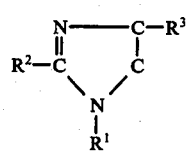

wherein $R^1$, $R^2$, and $R^3$ and independently selected from the group consisting of hydrogen, lower alkyl, phenyl and lower alkylphenyl. Particularly useful accelerators in this class are the following compounds:
Imidazole
2-ethyl-4-methylimidazole
1-benzyl-2-methylimidazole
1-methylimidazole
1,2-methylimidazole The accelerator in very small amounts serves to decrease the curing time without a significant sacrifice of shelf life. Thus, enough of the accelerator should be added to substantially decrease the curing time and not an excessive amount which produces gelation or imparts poor shelf life. An effective amount of imidazole accelerator is about 0.1–0.5 part by weight per 100 parts of epoxy resin, with the preferred amount being about 0.24 part by weight.

A critical aspect of our invention is the use of fiber spacers which provide a uniformly spaced, positive separation between segments under the conditions of heat and pressure required during curing. The cylindrical shape of the fibers is highly significant, since once the resin is dried, the fibers must stay locked in place. In contrast spherical bodies would tend to shift locations during application of heat and pressure. Any of a number of glass fibers, for example, conventionally available may be used and these include E-glass (silicate glass) and S-glass (magnesium aluminosilicate glass). These glasses can be manufactured to form fibers of great uniformity in diameter which provide uniform spacers. The fiber dimensions in addition to uniformity are very significant: the diameter should be about 0.50±0.05 mil (12–14 microns) and the length should be about 1/64 to 1/32 inch (400–800 microns). Fiber glass yarn within the prescribed diameter ranges are described by Oleesky and Mohr, previously cited, page 124 as the following:

| Product | Min. (in.) | Max. (in.) |
|---|---|---|
| J | 0.00045 | 0.00050 |
| K | 0.00050 | 0.00055 |

The amount of fiber glass spacers required to provide uniform separation and insulation of the segments is about 10 to 25 percent by weight of the total adhesive composition. When the amount of fibers is in excess of 25 percent by weight, there is no improvement in separation, but clumping of the fibers occurs together with tapering. When there are too few fibers, less than about 10 percent by weight, the dielectric strength is penalized with earlier failure and shorts occurring.

The fibers must be uniformly distributed in the adhesive coating solution and also on the surfaces of the segments. As a matter of fact deposition across the lamination phase should be so uniform that a monolayer of fibers is obtained without clumping. Once the fibers are applied they must be relatively fixed in place without sliding on the surfaces of the laminates.

Other inorganic fillers play an important role in the instant coating composition. These fillers are added to stabilize the overall composition, control the viscosity, and maintain the fibers in suspension. An illustration of such a filler is a highly dispersed silica available commercially under the trademark Aerosil OX 50 from Degussa Inc., which is produced from silicon tetrachloride in a flame hydrolysis process with oxygen-hydrogen gas. It has BET surface area of $50\pm15$ m$^2$/g, an average primary particle size of 40 millimicrons and a bulk density of approximately 80 g/l. Additional suitable fillers are fumed silica, sold under the name of CAB-O-SIL (L5) by Cabot Co., and a silica known as MIN-U-SIL sold by Pennsylvania Glass Sand Corp. which has a particle size of about 15 microns. The amount of these other fillers is typically up to about 10 percent by weight and usually in the range of 6-10 percent by weight of the total composition.

The coating formulation involves a combination of solvents and thinners. The uncured epoxy resin is soluble in oxygenated solvents, such as ketones, esters and ethers, and in highly halogenated hydrocarbons. Fast evaporating solutions are based on low boiling ketones such as acetone and methyl ethyl ketone. The thinners are employed to reduce costs and to regulate viscosity. Determination of proper solvent balance is somewhat of an art and improper selection will cause difficulties. A proper solvent blend will hold in the curing agent, while providing a continuous film. One typical blend for a diglycidyl ether of Bisphenol A consists of:

|  | Parts |
|---|---|
| Xylene | 32 |
| Methylisobutyl ketone | 32 |
| Cellosolve | 32 |
| Cyclohexanol | 4 |

After the coating has been applied to the segments, the solvent is removed at temperatures up to about 300° F for a short residence time of up to about 60 seconds. The dried coating is tack-free and remains reactive for bonding for an extended period of time, e.g., four months. Then the coated segments are stacked in a configuration of an element for forming a portion or the entire stator core. The element is thereafter pressed and cured at elevated temperatures and pressures. Examples of curing schedules are in a range of about a temperature of 150°-170° C, a pressure of 200-300 psi and for a period of time of about 1-7 hours. The curing temperature depends to a large extent on the curing agent used to crosslink the epoxy resin. The optimum curing schedule for a particular agent can readily be determined by routine experimentation by a person skilled in the art.

Our invention is further illustrated by the following examples:

EXAMPLE I

An adhesive-insulating coating was prepared from the following formulation:

| Ingredient | Part by weight |
|---|---|
| Araldite 6060 Epoxy resin | 31 |
| Dicyandiamide | 1.6 |
| 2-Ethyl-4-methylimidazole (10% solution in cellosolve) | 0.8 |
| Cellosolve | 30.5 |
| MIN-U-SIL | 8.1 |
| Aerosil OX 50 | 8.0 |
| Glass Fibers (1/64' long, 0.50 mil dia.) | 20.0 |

The Araldite epoxy resin is a diglycidyl ether of Bisphenol A. This composition was dispersed to form a homogeneous enamel for application to the metal segments.

EXAMPLE II

Another adhesive insulating coating was prepared from the following formulation:

| Ingredient | Parts by weight |
|---|---|
| Epoxy cresol novolac resin (ECN 1280) | 21.1 |
| Epoxy novolac resin (DEN 438) | 2.3 |
| Tyzor OG/BRZ-7541(1.1) | 2.3 |
| Epoxy resin (Epon 1002) | 7.0 |
| Cellosolve | 17.6 |
| n-Butylcellosolve | 17.6 |
| Cab-O-Sil fumed silica | 10.3 |
| Glass fibers (1/32' long, 0.50 mil dia.) | 10.3 |
| Min-U-Sil microsilica | 11.5 |

The curing agent Tyzor OG/BRZ-7541 was tetraoctylglycol titanate/phenol formaldehyde novolac containing 2 to 3 phenolic OH groups per molecule. This composition was dispersed to form a homogeneous enamel for application to the metal segments.

EXAMPLE III

Silicon steel punchings manufactured by Allegheny Ludlum Co. and coated with a 0.10 mil coating of magnesium phosphate were then coated with the enamel of Example I to a thickness of about 0.35 to 0.45 mil. The segments were stacked, pressed and cured as shown below. The bond strengths in psi were determined.

(a) A comparison was made to a dual coating system in which the segments were initially coated with an insulating phenolic resin and thereafter coated with an epoxy resin containing no glass fibers. The results as shown in the table below indicate that superior bond strength is obtained by the single bondable coating of our invention.

TABLE 1

| | | Bond Strength Retention as a Function of Thermal Aging | | | | | |
|---|---|---|---|---|---|---|---|
| | | Initial as Tested | | 60 days Aged at 180° C and tested at | | 150 days Aged at 150° C and Tested at | |
| Coating System | Cure Schedule | R.T. (psi) | 130° C (psi) | R.T. (psi) | 130° C (psi) | R.T. (psi) | 130° C (psi) |
| Dual system phenolic + epoxy | 6 hrs/ 160° C 300 psi pressure | 580 | 135 | 200 | 200 | 280 | 60 |
| Single coating bondable enamel of Ex. I | 1 hr/ 170° C 300 psi pressure | 720 | 145 | 600 | 350 | 580 | 480 |

(b) A comparison of the heat transfer properties was made between the single coating of Example I and the dual coating as shown in Table 1. The results indicate that the presence of glass fibers provides an improvement of 20-30 percent in heat transfer characteristics of the single coat bonded laminations over the dual coating system.

(c) Bonded segments using the enamel of Example I were then tested to determine the dielectric properties. These results were then compared to unbonded phenolic resin maintained under pressure and simulating the conditions present in the stator core. The results tabulated below indicate that an improvement is obtained using the epoxy enamel of Example I.

TABLE 2

| Coating System | Dielectric Strength Average Interlaminar Dielectric Strength (volts to failure) |
| --- | --- |
| Unbonded-cured phenolic | 137 volts |
| Bonded-cured epoxy of Ex. I | 170 volts |

It will be appreciated that the invention is not limited to the specific details shown in the examples and illustrations and that various modifications may be made within the ordinary skill in the art without departing from the spirit and scope of the invention.

What is claimed is:

1. A bonded stator core, for a dynamoelectric machine, which comprises
   (a) a multiplicity of steel segments stacked in the configuration of said core, each segment of at least a portion of said core being bonded to and insulated from the adjacent segment and
   (b) an interlayer between said segments for bonding and insulating said segments, said interlayer comprising a cured epoxy resin and a fiber spacer filler, said filler comprising cylindrical fibers having a diameter of 0.45–0.55 mil and a length of about 1/64–1/32 inch to provide uniform separation between the individual segments.

2. The stator core of claim 1, wherein said core is integrally bonded.

3. The stator core of claim 1, wherein the segments of only a portion of said core are bonded.

4. The stator core of claim 1, wherein said fiber spacer filler is glass.

5. The stator core of claim 4, wherein said fiber spacer filler is a silicate glass.

6. The stator core of claim 4, wherein fiber spacer filler is a magnesium aluminosilicate glass.

7. The stator core of claim 4, wherein said epoxy resin is a diglycidyl ether of Bisphenol A.

8. The stator core of claim 4, wherein said epoxy resin is an epoxy novolac.

9. The bonded stator core of claim 1, wherein the amount of the fiber spacer filler is about 10–25 percent by weight of the interlayer.

* * * * *